US006971545B2

(12) United States Patent
Martinez et al.

(10) Patent No.: US 6,971,545 B2
(45) Date of Patent: Dec. 6, 2005

(54) PORTABLE BEVERAGE/CUP DISPENSER

(76) Inventors: Phil Martinez, 6046 Natalie Rd., Chino Hills, CA (US) 91709; Robert Reider, 23258 Atlantis Way, Monarch Beach, CA (US) 92629

(*) Notice: Subject to any disclaimer, the term of this patent is extended or adjusted under 35 U.S.C. 154(b) by 357 days.

(21) Appl. No.: 10/456,992

(22) Filed: Jun. 9, 2003

(65) Prior Publication Data

US 2004/0245274 A1 Dec. 9, 2004

(51) Int. Cl.[7] .................... B65G 59/00
(52) U.S. Cl. .................... 221/199; 221/96; 222/192; 222/105
(58) Field of Search .................... 221/199, 96; 222/192, 222/105

(56) References Cited

U.S. PATENT DOCUMENTS

| | | | | |
|---|---|---|---|---|
| 2,323,841 A | | 7/1943 | Pape et al. | |
| 2,365,159 A | | 12/1944 | Walton et al. | |
| 2,570,283 A | | 10/1951 | Stevens | |
| 2,926,813 A | * | 3/1960 | Marion | 221/63 |
| 3,331,533 A | * | 7/1967 | Krugger | 221/96 |
| 3,349,960 A | * | 10/1967 | Ketler | 221/96 |
| 3,349,987 A | | 10/1967 | Weitzner | |
| 3,361,309 A | | 1/1968 | Simkins | |
| 3,409,183 A | * | 11/1968 | Gish | 221/308 |
| 3,604,592 A | | 9/1971 | Bacon | |
| 3,820,686 A | * | 6/1974 | Tyrseck | 221/305 |
| 3,896,977 A | * | 7/1975 | Bergstrom | 222/353 |
| 4,214,675 A | | 7/1980 | Schmit | |
| 4,623,075 A | | 11/1986 | Riley | |
| 4,850,506 A | | 7/1989 | Heaps, Jr. et al. | |
| D316,205 S | | 4/1991 | Conrad | |
| 5,050,775 A | | 9/1991 | Marquardt | |
| 5,156,295 A | | 10/1992 | Gordon et al. | |
| 5,301,833 A | | 4/1994 | Aycan | |
| 5,465,870 A | | 11/1995 | Sizemore | |
| 6,439,757 B2 | * | 8/2002 | Lloyd | 366/130 |
| 2003/0006243 A1 | * | 1/2003 | Looney | 221/96 |

* cited by examiner

*Primary Examiner*—Donald P. Walsh
*Assistant Examiner*—Kenneth W. Bower
(74) *Attorney, Agent, or Firm*—Robert T. Spaulding

(57) ABSTRACT

A rectangularly shaped rigid structure having a front panel including an opening therein, a top panel, a rear, bottom, left and right side panels. Also included is an interior panel that cooperates with the interior surfaces of the top, bottom, left and right side panels to form a front compartment dimensioned to contain a collapsible beverage container including a pour spout positioned to project through the front panel opening and a rear compartment dimensioned to contain a cup retainer that holds a plurality of vertically stacked disposable cups. A removable section of the rear panel, delimited by a horizontal linear series of perforations, can be detached so that access is gained to the bottom-most cup, which can be dispensed and placed under the pour spout to dispense the beverage.

6 Claims, 2 Drawing Sheets

PORTABLE BEVERAGE/CUP DISPENSER

BACKGROUND OF THE INVENTION

1) Field of the Invention

This invention relates generally to beverage containers that incorporate the "bag-in-box" concept in which a beverage is contained in a collapsible bag which in turn is contained in a rigid structure generally made of cardboard; containers that include a plurality if disposable cups, and more specifically to a dispenser that incorporates the features of each container.

2) Description of the Prior Art

U.S. Pat. No. 2,323,841 shows a method for dispensing conically shaped objects. U.S. Pat. No. 2,365,159 shows the "bag-in-box" concept, but does not include a cup-dispensing mechanism. U.S. Pat. No. 2,570,283 teaches a water dispenser further including an external cup-dispensing mechanism, but does not include the "bag-in-box" concept. U.S. Pat. No. 3,349,987 shows an invention that utilizes suction cups for drawing liquids from bottles, cans, and other containers of beverages. There is no provision for a cup-dispensing mechanism. U.S. Pat. No. 3,361,309 shows the "bag-in-box" concept but does not include a cup-dispensing mechanism. U.S. Pat. No. 3,604,592 teaches a combination cup and liquid dispenser but does not incorporate the "bag-in-box" concept. U.S. Pat. No. 4,214,675 discloses a pouch containing liquid in a container with a pouring spout that utilizes the "bag-in-box" concept. There are no cup-dispensing provisions. U.S. Pat. No. 4,623,075 utilizes the "bag-in-box" concept and prevents the collapsible bag from sagging, bulging or leaking. There are no provisions for a cup dispensing mechanism. U.S. Pat. No. 4,850,506 utilizes the "bag-in-box" concept but has no provisions for a cup-dispensing mechanism. U.S. Pat. No. 5,050,775 shows the "bag-in-box" concept in addition to an externally mounted cup holder. U.S. Pat. No. 5,156,295 describes a bag-lined carton including a pour spout but does not include a cup-dispensing mechanism. U.S. Pat. No. 5,301,833 teaches a liquid dispenser with cup holder in which the dispenser comprises a bottle such as that used for storing soft drinks including an annular recess that is dimensioned to receive plastic or paper cups. U.S. Pat. No. 5,465,870 shows a cup-type-vending machine including a plurality of "bag-in-box" packages and an internally mounted cup-dispensing machine. The system relies on several pumping stages and vacuum pressure for operation. Des. 316,205 does not utilize the "bag-in-box" concept. Applicants hereby incorporate herein by reference any and all U.S. patents, U.S. patent applications, and other documents and printed matter cited or referred to in this application.

Accordingly, one object and advantage of the present invention is to provide a dispenser that incorporates the features of the "bag-in-box" in conjunction with a cup-dispensing mechanism.

Another object and advantage is that an included flush carrying handle permits a plurality of the dispensers to be vertically stacked.

Other objects and advantages of this invention will become apparent from consideration of the drawings and ensuing description of it.

SUMMARY OF THE INVENTION

The present invention comprises a rectangularly shaped rigid structure having front, top, rear, left and right side, bottom panels and further including an interior panel all generally constructed from a cardboard type material. The interior panel separates the rigid structure into a front and a rear compartment. The front compartment is dimensioned to contain a prior art collapsible beverage container including a pour spout that is positioned to project through an opening in the front panel. The rear compartment is dimensioned to contain a plurality of vertically stacked disposable cups, each cup having a rim and positioned in place by a prior art cup retainer.

The rigid structure further includes a removable section of the rear panel, delimited by a horizontal linear series of perforations that will yield to thumbnail pressure and positioned opposite the rim of the bottom-most cup. The perforations extending laterally to form removable sections of the left and right side panels. Upon detaching the removable section, access is gained to the bottom-most cup, which can be dispensed and placed under the pour spout to dispense the beverage.

A rectangularly shaped removable section comprising a linear series of perforations that will yield to thumbnail pressure and positioned in the top panel of the rigid structure concentric with the center of gravity of the collapsible beverage container is included. Upon removal, the opening forms a flush handle, thereby facilitating the portability of the beverage/cup dispenser while retaining the ability to vertically stack a plurality of dispensers.

DESCRIPTION OF THE PREFERRED EMBODIMENT

Figure 3:
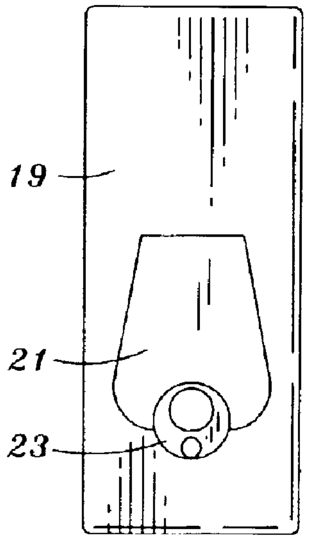
FIG. 3 shows a front view.
Figure 1:
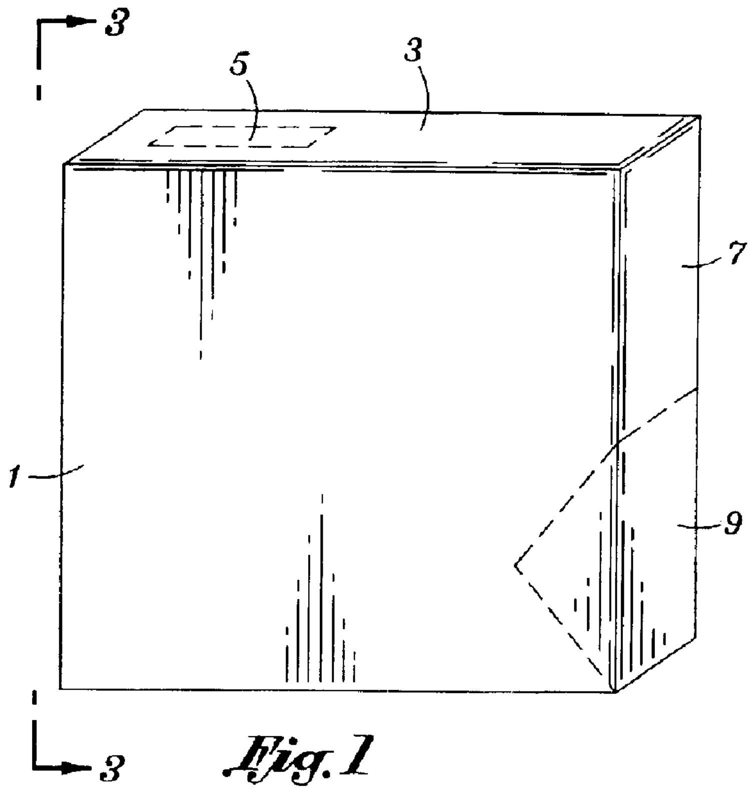
FIG. 1 shows a left side view of the portable beverage/cup dispenser.
Figure 2:
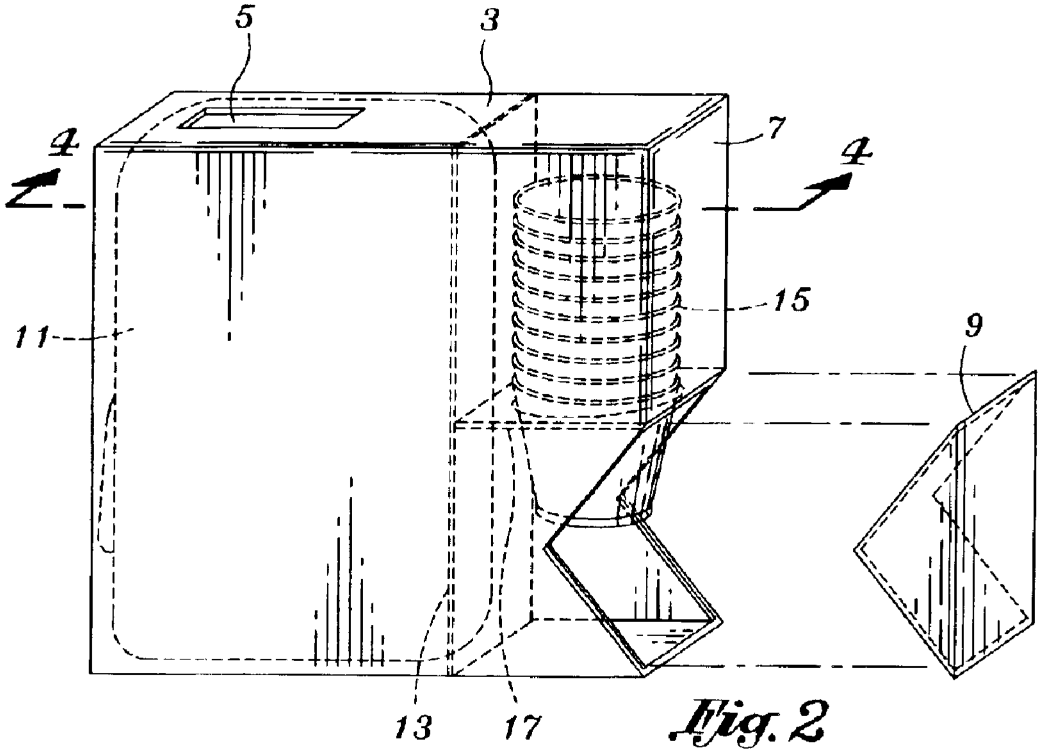
FIG. 2 shows a left side cutaway view.
Figure 4:
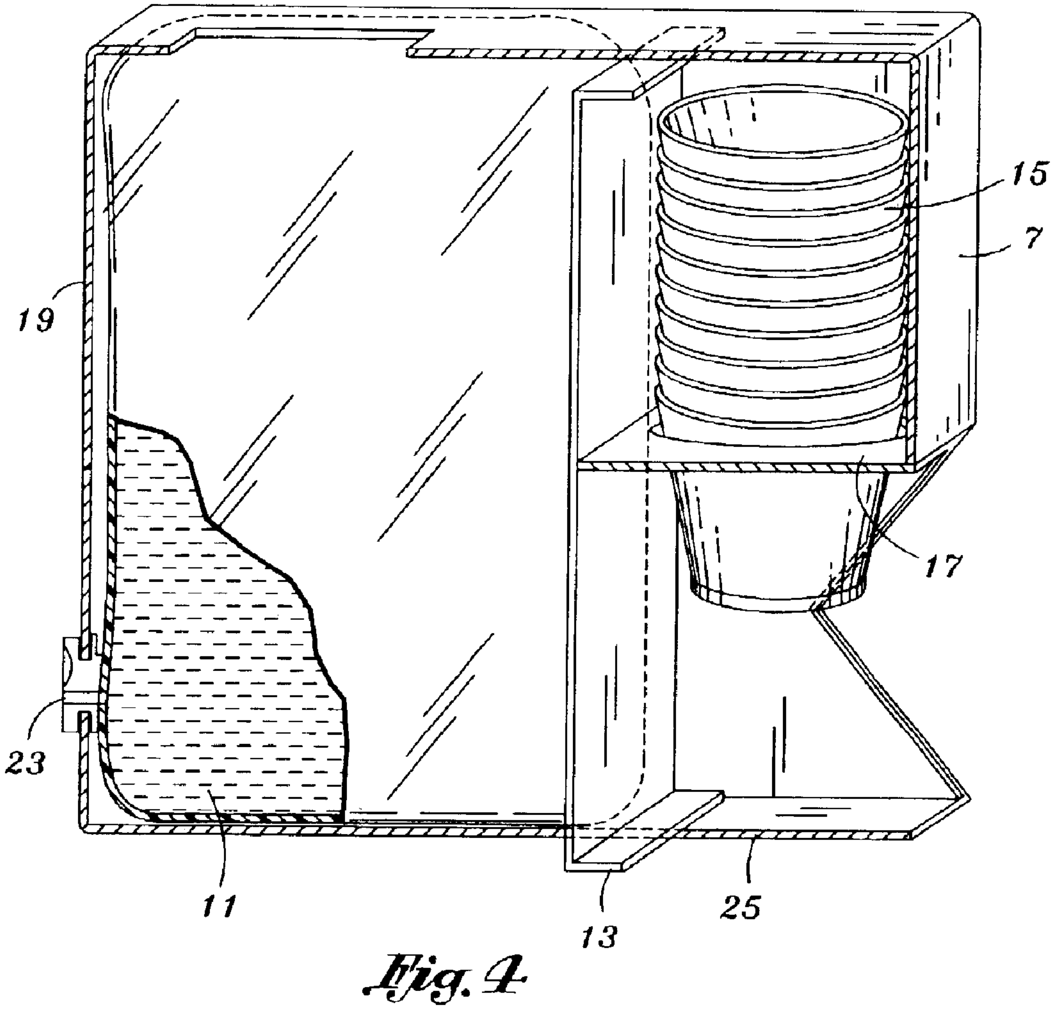
FIG. 4 shows a left side cutaway in which the removable section has been detached.

FIG. 1 depicts the left side view of the Portable Beverage/Cup Dispenser where the left side panel 1, the top panel 3, the removable rectangularly shaped section 5, the rear panel 7 and the removable section 9 may be clearly seen. All panels are generally made of cardboard. FIG. 2 depicts a left side cutaway view in which the removable section 5 has been detached, forming a flush-carrying handle. The removable section 9 is also detached, thereby allowing access to the vertically stacked disposable cups 15 that are positioned in place by the prior art cup retainer 17. Also seen in this view is the interior panel 13 that divides the dispenser into a front compartment and a rear compartment. The front compartment is shown containing a prior art collapsible beverage container 11 that includes a pouring spout (23, FIG. 3). FIG. 3 shows the front panel 19 of the Portable Beverage/Cup Dispenser in which a flap 21 delimits an included opening through which a pouring spout 23 protrudes. FIG. 4 shows a cutaway view of the left side panel with the removable section 9 detached in which the dispensing sequence may be seen as: removing the bottom-most disposable cup from the vertical stack 15, placing the cup under the pouring spout 23, and engaging the pouring spout 23 to dispense the beverage from the beverage container 11.

Based on the descriptions of FIGS. 1 through 4, it can be seen that the present invention provides a Portable Beverage/Cup Dispenser that may be conveniently transported.

Although the description above contains many specifications, these should not be construed as limiting the scope of the invention, but as merely providing illustrations of some of the presently preferred embodiments of the invention.

We claim:

1. A portable beverage/cup dispenser comprising a rectangularly shaped rigid structure having a front panel including an opening therein, a top panel, a rear, bottom, left and right side panels, further including an interior panel that cooperates with the interior surfaces of the top, bottom, left and right side panels to form a front compartment dimensioned to contain a collapsible beverage container including a pour spout positioned to project through the front panel opening; and a rear compartment dimensioned to contain a cup retainer including a plurality of vertically stacked disposable cups, each cup having a rim and positioned so that the bottom-most cup will be the first to be dispensed; a removable section of the rear panel, delimited by a horizontal linear series of perforations that will yield to thumbnail pressure and positioned opposite the rim of the bottom-most cup, said perforations extending laterally to form removable sections of the left and right side panels, whereby, upon detaching the removable section, access is gained to the bottom-most cup, which can be dispensed and placed under the pour spout to dispense the beverage.

2. The portable beverage/cup dispenser of claim 1, further including a rectangularly shaped removable section comprising a linear series of perforations that will yield to thumbnail pressure and positioned in the top panel of the rigid structure concentric with the center of gravity of the collapsible beverage container, so that upon removal, the included opening forms a flush handle, thereby facilitating the portability of the beverage/cup dispenser while retaining the ability to vertically stack a plurality of dispensers.

3. A portable beverage/cup dispenser comprising a rectangularly shaped rigid structure having a front panel including an opening therein, a flush top panel, rear, bottom, left side, right side and bottom panels whereby the improvement comprises an interior vertical panel that separates the structure into front and rear compartments, said front compartment dimensioned to contain a collapsible beverage container including a pour spout positioned to project through the front panel opening; said rear compartment dimensioned to contain a cup retainer including a plurality of vertically stacked disposable cups, each cup having a rim and positioned so that the bottom-most cup will be the first to be dispensed; a removable section of the rear panel, delimited by a horizontal linear series of perforations that will yield to thumbnail pressure and positioned opposite the rim of the bottom-most cup, said perforations extending laterally to form removable sections of the left and right side panels, whereby, upon detaching the removable section, the bottom-most cup can be dispensed and placed under the pour spout to dispense the beverage.

4. The portable beverage/cup dispenser of claim 3, further including a rectangularly shaped removable section comprising a linear series of perforations that will yield to thumbnail pressure and positioned in the top panel of the rigid structure concentric with the center of gravity of the collapsible beverage container, so that upon removal, the included opening forms a flush handle, thereby facilitating the portability of the beverage/cup dispenser while retaining the ability to vertically stack a plurality of dispensers.

5. A method for dispensing a beverage and a disposable cup from a rectangularly shaped portable dispenser having a front panel including an opening therein, a flush top panel, a rear panel, a collapsible beverage container including a pour spout that projects through said opening, and a plurality of disposable cups comprising the steps of:

a) detaching a removable section of the rear panel, delimited by a horizontal linear series of perforations that will yield to thumbnail pressure and positioned opposite the rim of the bottom-most cup, said perforations extending laterally to form removable sections of the left and right side panels, from the rear panel, b) removing a disposable cup, c) placing the cup under the pour spout, d) dispensing the beverage.

6. The method of claim 5, further including detaching a rectangularly shaped removable section comprising a linear series of perforations that will yield to thumbnail pressure and positioned in the top panel of the rigid structure concentric with the center of gravity of the collapsible beverage container, so that the included opening forms a flush handle.

* * * * *